(12) United States Patent
Dale

(10) Patent No.: US 7,371,326 B2
(45) Date of Patent: May 13, 2008

(54) WATER TREATMENT/REMEDIATION SYSTEM

(75) Inventor: Charles A. Dale, Morgan Hill, CA (US)

(73) Assignee: Ionics, Incorporated, Watertown, MA (US)

( * ) Notice: Subject to any disclaimer, the term of this patent is extended or adjusted under 35 U.S.C. 154(b) by 352 days.

(21) Appl. No.: 10/917,255

(22) Filed: Aug. 12, 2004

(65) Prior Publication Data
US 2005/0040111 A1    Feb. 24, 2005

Related U.S. Application Data

(60) Provisional application No. 60/494,523, filed on Aug. 12, 2003.

(51) Int. Cl.
*C02F 1/42* (2006.01)

(52) U.S. Cl. ........................... 210/677; 210/683

(58) Field of Classification Search ............... 210/677, 210/683
See application file for complete search history.

(56) References Cited

U.S. PATENT DOCUMENTS

| | | | | |
|---|---|---|---|---|
| 5,604,264 A | * | 2/1997 | McQuigg | 521/38 |
| 6,066,257 A | * | 5/2000 | Venkatesh et al. | 210/615 |
| 6,800,203 B2 | * | 10/2004 | Gu et al. | 210/677 |
| 6,908,560 B2 | * | 6/2005 | Guter | 210/675 |

* cited by examiner

*Primary Examiner*—Matthew O. Savage
(74) *Attorney, Agent, or Firm*—Global Patent Operation; Michael Falkoff

(57) ABSTRACT

A treatment system passes feed water containing a contaminant such as perchlorate through a bed of strong base anion exchange resin that has been placed in a form (e.g., in sulfate form) to selectively capture the contaminant while passing other ions (e.g., nitrate) that may also be present in the water. The bed may include a carousel, and the exhausted upstream portion of the resin may efficiently be disposed of by incineration, or may be rotated out for regeneration.

1 Claim, 3 Drawing Sheets

SELECTIVITY COEFFICIENTS OF VARIOUS ANIONS
(COMPARED WITH THE HYDROXYL ION)
ON FUNCTIONALIZED STYRENE/DIVINYLBENZENE
ANION-EXCHANGE RESINS OF DIFFERENT BASE STRENGTH

| Ion | Type I | Type II |
| --- | --- | --- |
| $OH^-$ | 1.0 | 1.0 |
| Benzene sulphonate | 500 | 75 |
| Salicylate | 450 | 65 |
| Citrate | 220 | 23 |
| $I^-$ | 175 | 17 |
| Phenate | 110 | 27 |
| $HSO_4^-$ | 85 | 15 |
| $ClO_3^-$ | 74 | 12 |
| $NO_3^-$ | 65 | 8 |
| $Br^-$ | 50 | 6 |
| $CN^-$ | 28 | 3 |
| $HSO_3^-$ | 27 | 3 |
| $BrO_3^-$ | 27 | 3 |
| $NO_2^-$ | 24 | 3 |
| $Cl^-$ | 22 | 2.3 |
| $HCO_3^-$ | 6.0 | 1.2 |
| $IO_3^-$ | 5.5 | 0.5 |
| Formate | 4.6 | 0.5 |
| Acetate | 3.2 | 0.5 |
| Propionate | 2.6 | 0.3 |
| $F^-$ | 1.6 | 0.3 |
| $HSiO_3^-$ | <1.0 | <1.0 |

Figure 2

WATER TREATMENT/REMEDIATION SYSTEM

REFERENCE TO RELATED APPLICATION

This application is related to and claims the priority benefit of U.S. Provisional Patent Application Ser. No. 60/494,523, WATER TREATMENT/REMEDIATION SYSTEM, filed by applicant on Aug. 12, 2003.

BACKGROUND

The present invention relates to water treatment, and has as a primary goal the treatment of waste water or of ground water, for environmental remediation or for the production of a higher grade water, for example, to produce water that is useful directly or with blending to produce an industrial, agricultural or potable product water. The invention particularly addresses processes for removal of perchlorate from a water source. The perchlorate may be present in the source either alone or in conjunction with other contaminants or native impurities.

Perchlorate is largely a man-made contaminant, typically found in ground water near munitions depots and firing ranges, rocket launch or test sites, fireworks, munitions and fertilizer factories, rocket fuel manufacturing plants and other military or industrial sites. The material is persistent in the environment, and in many cases has accumulated or has been accumulating in ground water without oversight or regulation for decades. In the United States, high levels of perchlorate have been found at hundreds of sites in more than twenty states, sometimes in a contaminated ground water plume that extends for miles from a site or originating locus of a contaminating activity. Commonly, perchlorate is present as an ammonium, sodium or potassium perchlorate, or a combination thereof; nitrates may also be present, either naturally, or from the same initial contaminating activity or its metabolites; other dissolved or suspended solids characteristic of the underlying ground water may also be present.

In the United States, perchlorate contamination is estimated to threaten or actually impinge upon the drinking water supplies of over fifteen million people in a few western states, and occurrences of less immediate health concern are found in many states from Massachusetts to Texas. Much remains to be elucidated about the effects of perchlorate exposure on human health; uptake and long term risk modeling are not well developed, and a federal maximum contaminant level (MCL) has yet to be set for drinking water, effluent discharge or remediation. Interim standards or state-imposed limits or recommendations for public water supplies have tended to follow the advance of measurement technology and the development of assays with lower detection limits; scientific studies elucidating health effects at these low levels will necessarily lag behind the relatively recent enhancements of measurement capability. Meanwhile, however, some sites or regions with extremely high concentrations in groundwater have been identified, and plumes with clearly unacceptabe high perchlorate concentrations have entered or currently threaten a number of wells in municipal water systems, thus requiring closure of the wells and/or remedial treatment of the groundwater at and/or upstream of the affected well.

Some treatment processes have been instituted since the late 1990s at a number of affected locations, generally operating to achieve perchlorate removal down to the range of 1.5-10 ppb in a (possibly blended) product water. At other sites where there is no threat to drinking water supplies, different limits may be applied when the goal of treatment is to treat and re-inject groundwater to decontaminate a plume, or to supply water of a quality suitable for certain agricultural uses.

At the present time it appears likely that a range of adverse health effects of perchlorate will soon be documented, and that fairly stringent regulatory thresholds will be established for consumption or discharge of this material. Applicant anticipates that, once perchlorate becomes regulated, treatment will be needed for a number of industrial water uses (such as make-up boiler or cooling water) which have little apparent connection with human exposure, but which result in a waste stream having the existing contaminants concentrated many-fold over that of the source water. These applications may require initial perchlorate removal from the raw feed stream, or may later require decontamination of their waste fields, when the source water itself contains even small amounts of perchlorate.

In view of the scale of the problem, it would be highly desirable to identify effective treatment protocols and apparatus for removal of perchlorate.

A number of methods have seen some use.

One technology for remediation of perchlorate in ground water is to pump the water from suitably-positioned wells, pass it through one or more anion exchange resin beds, and either return the treated product to the ground or pass the product to an intended use, while the perchlorate and any other contaminants are captured in the exchange resin, which may then be discarded or regenerated. When the exchange beds are periodically regenerated, the accumulated perchlorate enters the regeneration waste fluids. The spent regeneration fluids may then be disposed of as a solid or otherwise concentrated waste, or may be broken down in a bioreactor or composting process, or may be incinerated on-site. Incineration may be preferred, because this eliminates the possibility of downstream legal liability that might arise if the waste were to be sent elsewhere, and also because, as a practical matter, concentrated perchlorate waste may be highly unstable or explosive. Spent perchlorate-loaded brine from a resin regeneration facility may also be discharged at sea, but it is widely expected that permits to continue such disposition will may not be available in the future.

As a removal tool, ion exchange beds may offer a highly effective treatment, which may, depending on concentration and the other ions that are present, may potentially treat thousands of bed volumes of the feed water between bed regeneration. However, the specific operating characteristics of an ion exchange resin will depend upon the amount and concentrations of components that are present in the water being treated, upon the extent of any pretreatment, and upon the exchange endpoints that are required in view of the intended use and/or the further processes that are to be applied downstream. In the western United States, much of the perchlorate contamination is present in highly mineralized groundwater, for which additional or coordinated treatments would be required to allow perchlorate to be treated efficiently or economically. Typically, different perchlorates—ammonium, sodium and potassium salts—and potentially nitrate, sulfate, and/or other native or contaminant species may be present in a contaminated groundwater plume, and the distribution of these components may influence the capture characteristics, regenerability and overall capacity and aging characteristics of the bed.

The effectiveness of the capture and the regeneration processes and the cost of necessary regeneration chemicals (as well as cost of disposal of spent chemicals) constitute substantial variable factors affecting the commercial feasibility or even the utility of ion exchange treatment. It is therefore desirable to make capture as efficient as possible. Operation should also be stable and predictable. However, western groundwaters may possess relatively high concentrations of sulfate and nitrate, making it difficult to effectively capture perchlorate at the low ppb concentrations required for drinking water standards.

One recent tool developed for such treatment tasks is an anion exchange resin that has been bifunctionalized, for example with two different tertiary amines, to introduce controlled hydrophobicity and limited steric hindrance such that the resin has high selectivity for the less hydrated anions—perchlorate, pertechnate or iodide—over more highly hydrated ions such as nitrate, while still having high overall capture capacity and/or capture rate. One such resin, described in U.S. Pat. No. 6,059,975, has been commercialized as a specialty resin now often cited as suitable for use in site remediation of perchlorate-contaminated plumes. A related multi-step sequential chemical replacement regeneration process has also been developed to optimize use of the bifunctional resin for removal of these ions, as described in U.S. Pat. No. 6,448,299 of the same inventors. These resins are, however, relatively expensive.

Generally, one may expect treatment with any anion exchange resin to effect some degree of perchlorate removal. However, at low concentrations, large residence time in the bed—a ong path length or low flow rate—would seem to be necessary. Moreover, if one runs the feed through a standard anion exchange resin bed, the removal is not selective; nitrate, sulfate and other ions will be taken up to a much greater extent than occurs with the bifunctional specialty resin, reducing bed lifetime and capture efficiency. Any of these ionic species may also later be released or displaced in quantity when other species are presented in the feed, reducing the quality of the product. For example, a sulfate spike in the feed would displace accumulated nitrate from the bed. This possibility is especially to be considered when the concentration of these other co-ions in the ground water is already high. For example, with a groundwater sulfate concentration of 1000-2000 ppm range, the bed will saturate with sulfate, and subsequent operation, while capturing perchlorate, will pass the sulfate; a sulfate spike in the feed will release captured nitrate. More generally, the competitive or multivariate nature of ion-exchange processes does not allow perchlorate removal to be considered in isolation from other aspects of water treatment. When treating water to high purity for potable or industrial use, and one must address the problem of removing all contaminants down to an effective level; when treating solely to remediate perchlorate-laden groundwater on must remove perchlorate efficiently in the presence of other dissolved solids.

There has been relatively little commercial experience with complete or integrated treatment systems, and possible treatment modalities and their operating parameters remain to be explored. To move beyond feasibility studies, or highly subsidized pilots designed to clean up a particular site, it would be desirable to identify further methods or apparatus capable of removing perchlorate, and which may be dependably added to or integrated with a water treatment line of general utility without unexpectedly introducing or impairing the removal of other species.

It would also be desirable to provide an inexpensive yet effective method of removing perchlorate from a source water.

It would further be desirable to provide a well-quantified unit process that may be provided and predictably scaled to dependably pretreat water from a perchlorate-contaminated well, as a front-end treatment such that the product water is treatable by an existing treatment plant or a new plant of conventional design.

It would also be desirable to provide a dependable front end treatment for industrial water that dependably and predictably produces water substantially purer than a specified limit, such that the treated water may be applied to a given use, concentrated and ultimately discharged without exceeding such limit.

It would also be desirable to provide a perchlorate removal treatment that results in a small or limited waste stream or solid waste residue.

SUMMARY OF THE INVENTION

One or more of these or other desirable ends are achieved in accordance with the present invention by a treatment system and method wherein feed water that contains perchlorate or similar contaminant is passed through a bed containing anion exchange resin that has been placed in or regenerated in sulfate form. Preferably the resin is a strong base anion exchange resin, for example, Dowex 1. This may be a standard grade general purpose resin that is inexpensive and readily available in quantity. In accordance with a principal aspect of the invention, a perchlorate-bearing feed water is passed through the bed, and the perchlorate is captured by the resin, while co-ions such as nitrate that may be present in the water, and for which the sulfate-form resin has lower capture affinity, are unaffected. The bed therefore removes perchlorate with high efficiency, for example on a stoichiometric basis.

Treatment according to the present invention may be carried out as a unit process, ahead of an existing groundwater treatment, and may be readily applied to individual affected wells of a system, allowing great flexibility in sizing the beds to the scope of treatment needs. A certain amount of pretreatment maybe provided (e.g., to prevent fouling), but these too may be sized for the immediate treatment needs. The perchlorate-free product may then be treated and downstream processes applied to effect removal of components still remaining in the water, using suitable treatment, which may be of conventional design.

In accordance with one aspect of the present invention, the resin may be arranged in plural bottles or beds, configured, e.g., by employing a carousel or suitable arrangement of control valves, such that the feed flows in series through the beds, and such that the front or maximally-loaded bed of the series may be removed or regenerated in situ, while flow continues through the remaining beds of the series and one or more downstream beds may be replaced with fresh or regenerated resin to assure effectively complete removal of perchlorate as well as of species displaced from upstream resin. In this way, the beds may remain in service for extended times even as their capture efficiency drops or bleeding increases and the front bed becomes fully loaded with the perchlorate removed from the feed water. The front bed may then be efficiently regenerated (if the resin is to be re-used) or may be sent to waste (if the resin is to be incinerated or otherwise disposed of, so that the least amount of resin is used.

In accordance with another aspect of the invention, the capture resin or a substantial portion thereof, may be substantially regenerated and its perchlorate burden may be concentrated for disposal. Once the resin in the exchange bed has been exhausted, the resin may be disposed of by incineration, or the bed may be periodically regenerated, either on- or off-site. Regeneration is accomplished by running a concentrated stripping fluid through the bed to displace captured perchlorate ions into the fluid. The regeneration fluid may be reused one or more times, optionally undergoing a precipitation/crystallization step or other treatment to remove accumulated impurities or restore the concentration of exchange ions so that the resin may be returned to (a possibly intermediate position in) the carousel. Stripping of captured perchlorate and overall operation of this regeneration step is preferably carried out with a suitable concentrated brine or brines and appropriate rinse operations in a manner to avoid scaling in the resin. The regen waste or a concentrate thereof may disposed of by incineration, bioreaction or other disposal process.

In one presently preferred embodiment of such a system, the bed operates to remove perchlorate down to a low threshhold, for example below 4 ppb or below 1 ppb. After a suitable duty life, the perchlorate-loaded spent resin undergoes a regeneration process to remove captured perchlorate and place the resin back in sulfate form. This regeneration may be effected off-site at a dedicated facility which is set up to effectively regenerate resin and minimize the amount of perchlorate waste. The concentrated stripping brine used as a regeneration fluid for this process, which may for example amount to few bed volumes, may be passed through a smaller capture bed to remove and separate the accumulated perchlorate from the stripping brine, allowing disposal of the thus-concentrated perchlorate waste and re-use of the brine. Because the spent brine initially has a very high concentration (unlike the groundwater in the primary treatment process) the exchange kinetics allow the perchlorate in the brine to be effectively removed using a relatively small volume of resin, e.g., five to fifteen percent of the original bed volume. The small volume of highly-loaded spent resin thus produced may then be incinerated, digested by perchlorate-destroying microorganisms or otherwise disposed of.

The above-describe removal process that employs a standard resin in sulfate form greatly reduces the initial cost of bed media compared to the usual specialized perchlorate or pertechnate-specific capture or exchange resins, while the second stage of the process that involves regeneration of spent resin and transfer of captured contaminants into a concentrated brine or into a lesser volume of resin (cleaning up the stripping fluid used in regeneration, so it may be used further), greatly lowers the volume of waste generated in the process and reduces operating expenses.

A practical treatment system may place the capture resin in multiple series-connected beds or vessels (for example a carousel) arranged so that the upstream vessel or vessels become highly loaded. Although the capture efficiency of these vessels may progressively diminish as the resin loads, the downstream vessels assure completeness of the overall perchlorate removal process. Periodically the first (upstream) vessel is removed and regenerated; it's high perchlorate content makes the regeneration process highly efficient. Depending upon the degree of regeneration achieved, the vessel may be returned to service at the down stream end (fully regenerated) or an intermediate position. In one aspect of the invention, virgin resin instead of regenerated resin may be supplied for the last (downstream) vessel(s) at the time the first (upstream) vessel is removed. The spent resin may be regenerated by circulating concentrated sulfate brine therethrough, while the concentrated perchlorate fluid thus produced may be cleansed, e.g., by various precipitation processes, or by passing it through similar resin, to remove the perchlorate for ultimate disposal. The treatments may be integrated with a moving carousel or a (stationary) arrangement of vessels and valves controlled to place the beds in the described sequence and selectively regenerate or condition a vessel to enhance overall removal and economically concentrate a disposable waste.

BRIEF DESCRIPTION OF THE DRAWINGS

These and other features of the invention will be understood from the description and claims herein, taken together with the drawings illustrating details and representative embodiments of the invention, wherein:

FIG. 2 is a table of representative capture affinities for different ions in a feed stream;

DETAILED DESCRIPTION

Figure 1:
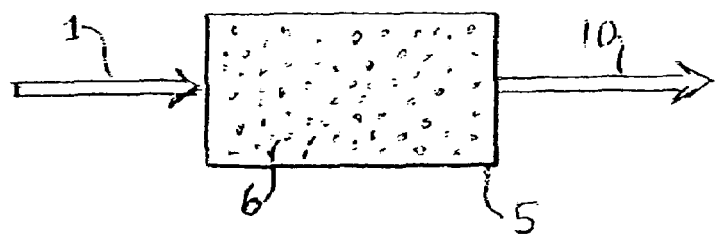
FIG. 1 schematically depicts a water treatment system of the present invention.

FIG. 1 illustrates a basic embodiment of a water treatment system, or a stage of a water treatment system of the present invention. A source water 1, which may be a contaminated ground water, a waste stream containing contaminant, or a pretreated or an intermediate product or waste stream of a treatment plant, is passed through an ion exchange bed 5 containing anion exchange material 6 to selectively remove perchlorate ions and produce a treated stream 10 of lesser perchlorate concentration.

In accordance with a principal aspect of the invention, the exchange material has been placed in a form that substantially prevents capture of natural co-ions present in the source, and assures that the perchlorate is selectively and substantially captured by the resin. Preferably the anion exchange material is a strong base anion exchange material, such as Dowex 1, Marathon MSA or other readily available and inexpensive exchange material, and this resin is placed in sulfate form. In this form, the resin does not pick up, or at least does not predominantly pick up or prematurely saturate with, nitrate or similar ions that are present in the source 1. Advantageously, this assures that the presence of other ions in the source water for which the resin would normally have a high affinity (such as sulfate ions) do not cause the bed to bleed or release a spike (e.g., of nitrate). The bed may thus operate with high capacity (for perchlorate), and without releasing impurities for an extended time, e.g., until the bed reaches perchlorate exhaustion.

A suitable strong base anion exchange material 6 may be formed, for example, by taking a strong base resin in a conventional hydroxide or chloride form, and "converting" or "regenerating" it by circulating a sulfate solution through the bed. The starting resin may be a strong base anion exchange resin of any suitable type, e.g. macroporous, macroreticular, gel-type, shell-type or other class of resin, and desirably may be a resin that is treated to resist organic or other fouling. For some applications, it is preferred that the resin be a drinking water certified resin. FIG. 2 shows representative selectivity coefficients of various anions on exchange-functionalized type I and type II styrene/divinylbenzene anion exchange resins. While not specifically listed in this Table, the selectivity for sulfate is substantially higher than most common naturally occurring ions in ground water, and the coefficient of perchlorate is even higher. Species such as silica or boron are near the bottom of the scale, and will be displaced back into the flow when higher-selectivity species are present in the feed, migrating downstream in the bed unti breakthrough occurs. Thus, it will be seen that by placing the resin in sulfate form, a majority of commonly encountered anion species will not be captured. The treated output 10 is depleted of or sufficiently reduced in perchlorate, and may pass, directly or as a blended component, to an intended final use (such as irrigation), or to a further treatment unit or system (such as a drinking water treatment system, boiler water make-up treatment system, UPW treatment or other system). When the purpose of perchlorate removal treatment is environmental site remediation, the treated stream 10 may be re-injected into the ground water.

Figure 3:
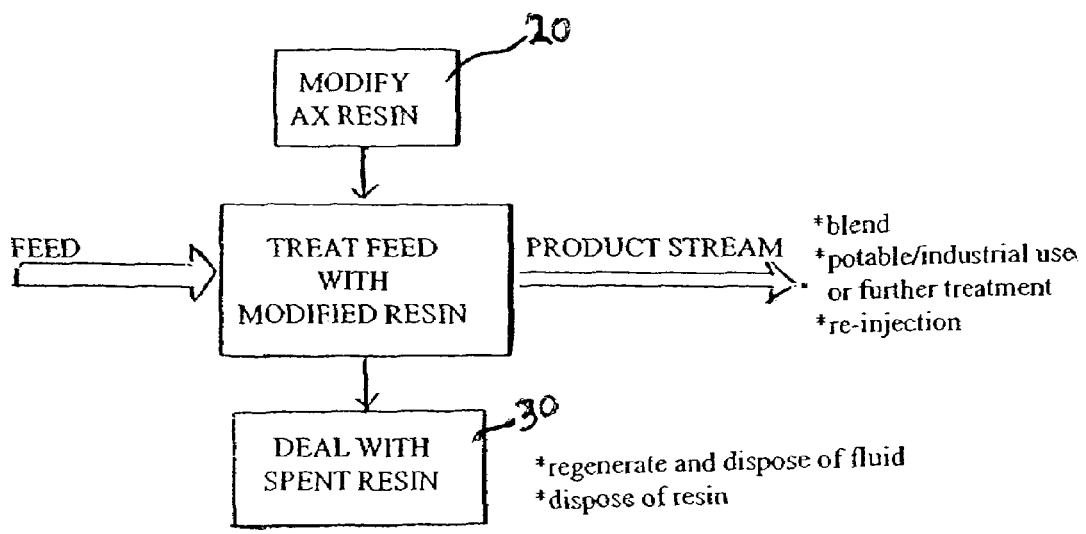
FIG. 3 schematically show a perchlorate capture and re-transfer treatment process of the invention.

Preferably efficiency is enhanced in additional ways. FIG. 3 illustrates, in broad terms, processes of the present invention, wherein a feed water is treated by passing through resin 6 (FIG. 1), and a resin treatment or disposition cycle operates to maximize or enhance resin utilization. The resin treatment process may include, e.g., an initial modification 20 to sulfate form (when the resin is not commercially sold in that form), and regeneration or disposition 30 of the spent resin. In order to compensate for the poor kinetics of the perchlorate ion, the bed path length or residence time may be increased. Preferably this is done by increasing the path length, rather than by reducing the flow velocity.

Figure 4:
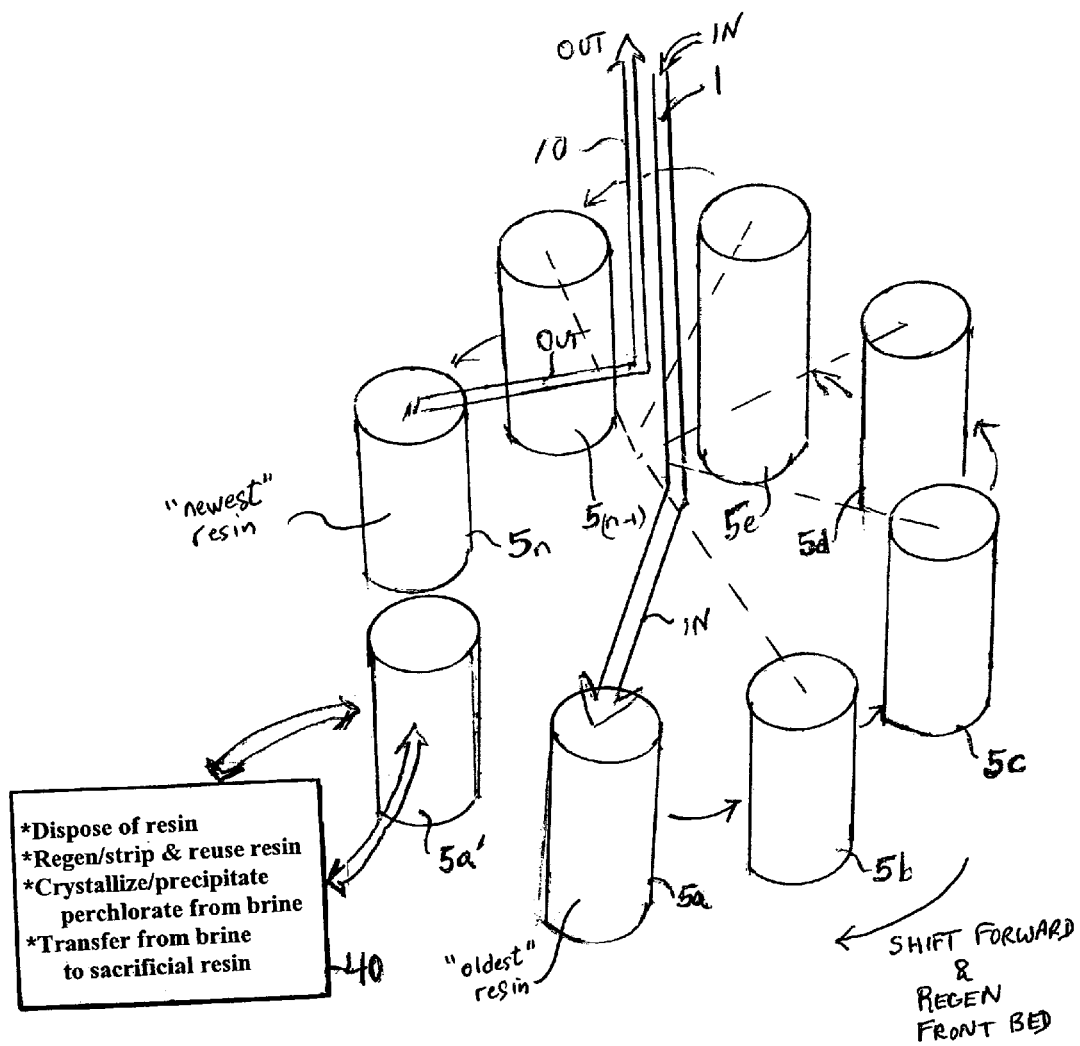
FIG. 4 illustrates further aspects of the invention.

FIG. 4 illustrates in schematic form one presently preferred embodiment of the invention, wherein the resin is arranged in a succession of bottles or beds $5a, 5b \ldots 5n$ with plumbing (shown schematically, with the connector for intermediate vessels omitted) such that the feed flows through the vessels in series from the inlet 1 of a first vessel $5a$ to the outlet 10 of a last vessel $5n$. The bed is run until a certain level of loading has been reached in an upstream vessel (e.g., first vessel $5a$), and that position is periodically removed, while a new vessel $5n'$ of fresh or freshened resin is brought in at the downstream end. This may occur when vessel $5a$ reaches a defined saturation level, and/or when vessel $5n$ reaches a loading such that it unacceptably bleeds species. By connecting the vessels in series in this fashion, the mean path length in the bed is made sufficiently long to assure effective capture of the perchlorate. Moreover, by arranging the beds in sequence, the first or upstream bed may remain in service for a long time and accumulate a high loading, even though its effectiveness at removing perchlorate will decrease as the loading rises and yield a lower quality output. The downstream vessels $5b \ldots 5n$ complete the removal. Moreover, one or more of the downstream vessels, preferably the last one or ones, includes fresher or regenerated resin to assure that the vessel does not bleed more weakly-held species back into the flow, and to assure that the perchlorate is completely captured.

The vessels may be carried by a carousel 40 as schematically shown in the Figure, or may be arranged in a separate stationary beds to achieve the same operation (for example, a so-called virtual carousel) defined by short segments of interconnecting conduit and a number of controllable multi-port multi-position valves that are suitably operated to connect the inlet 1 to a first one of the vessels $5a$, connect the outlet of each successive vessel to the inlet of the next, and the outlet of the last vessel of the selected sequence to product outlet line 10. As further shown in FIG. 4, one vessel $5a'$ has been taken from the treatment flow path 1-10, and is connected to a recovery/stripping/waste disposal process 40. Vessel $5a'$ that is rotated out of service may be, for example, the vessel that was previously in first position, and is the vessel with the highest loading. Process 40 may take several forms, which may require the physical removal of vessel $5a'$ from the system and outright disposal of spent resin, or may involve temporary connection to fluid treatment lines while the vessel $5a'$ remains in the system and is regenerated in situ to remove the captured perchlorate from the spent resin. The carousel or plumbing arrangement for configuring the resin beds in series and/or selectively regenerating the upstream resin may also be operated to initially condition one or more, or all of the beds into sulfate form by circulating sulfate through the resin while it is otherwise off-line. Such conversion, conditioning or regeneration may also be effected at an intermediate position, so that only the front beds are in sulfate form, and the downstream beds effect normal demineralization of the product water after it leaves the first three beds. However, it may be preferred in that case (for example to avoid scaling) that the sulfate-form portion of the sequence be established with resin having no ionic load, and that the downstream sequence of non-sulfate beds be maintained separate from the perchlorate removal beds at the front of the sequence. For example, in a sequence of seven beds $5a \ldots 5g$, $5a \ldots 5c$ may be in sulfate form, with a regenerated bed $5c'$ rotated in as $5a$ is stripped, and the downstream beds $5d \ldots 5g$ may be arranged as a separate carousel, virtual carousel or other utilization arrangement (for example, as shown in U.S. Pat. Nos. 4,687,582; 5,069,799; 6,706,195 or the like).

The spent, maximally perchlorate-loaded resin in vessel $5a$ may be incinerated or otherwise disposed of. Disposal may be seen as a relatively economical alternative, because the resin is initially inexpensive, and it has been fully used. Alternatively, the resin in the vessel rotated out of service may be cleaned or regenerated by running a stripping brine and suitable rinses and other fluids through the resin to remove all or a substantial portion of the captured perchlorate and return the resin to a regenerated or active ion exchange state. This stripping or regeneration may be carried out to fully regenerate the resin (e.g., in sulfate form), or may be carried out to a lesser endpoint that restores sufficient capacity and activity to allow the vessel to return to an intermediate stage of the carousel or treatment line.

As further shown in FIG. 4, when the resin of vessel $5a'$ is regenerated with a stripping brine, then further stages may also be carried out to separate or dispose of the perchlorate that is transferred into the brine. In general, the stripping brine may be maintained at a high concentration of the relevant species (e.g., sulfate) by addition of salt, and stripping of perchlorate into the brine should be quite efficient. By transferring the perchlorate into the brine during the regeneration stage, the total removed perchlorate becomes a concentrated liquid waste that may be disposed of, for example by sea dumping or offshore outfall, if permitted. The perchlorate may alternatively be separated from the brine for disposal. Various separation techniques are possible. For example, when the perchlorate concentration rises to a high level, the brine may pass to a crystallizer or undergo a precipitation process, which may be initiated or enhanced using suitable agents, and/or the solids may be recovered in a filter press or the like. Separation may be achieved by precipitating one species (e.g., sulfate) and then further concentrating the other by applying electrodialysis or other enhanced separation/concentration process to the supernatant or filtrate. Alternatively, the perchlorate-laden brine may be diluted and passed through a sacrificial resin bed (composed, for example, of cracked and/or otherwise damaged exchange beads) to capture the perchlorate in the sacrificial bed. This perchlorate-loaded resin is then discarded, buried, bio-degraded, incinerated or otherwise disposed of.

It will be appreciated that many common treatment or water usage processes will concentrate the contaminants already present in water. Thus, for example, solids and ionic species will be concentrated in the reject of a reverse osmosis unit, ionic species will be elevated in the concentrate stream of an electrodialysis unit, and non-volatile contaminants of all types will be concentrated in the residue of water employed for purposes such as evaporation in cooling towers. Such industrial reject, brine or residual fluids may advantageously be treated by the treatment and exchange resin 5 of the present invention. In general, the concentration factor of such brine, concentrate or waste stream (relative to that of the feed) may vary in a manner known in the art. For example, the concentration factor for a single pass RO brine stream may be between about 2 and about 20, depending on recovery, for many components of the stream. The treatment of the present invention may be applied to such residue, or may be applied to a feed water before has passed to the treatment or operation that results in concentration. In accordance with a preferred aspect of the present invention, when the treatment process is operated to remove perchlorate ahead of a system or unit process, the removal beds and flows are sized to reduce perchlorate to a level not just below an applicable health or regulatory discharge threshold, but below a small fraction of the applicable maximum contaminant level or discharge threshold; advantageously, this small fraction is set to be less than the reciprocal of the concentration factor of the treatment or usage operation. Alternatively, the removal system may be set up to operate on the concentrated waste, in which case it may treat the waste stream simply to meet the required MCL or discharge threshold, or to meet an intermediate level such that when blended with other treatment streams of the system the effluent meets such discharge limit.

It will further be appreciated that the mechanism of selective capture using a common strong base anion exchange resin may also be applied to effectively remove similar ions, such as pertechnate, and certain other environmentally significant contaminants, such as uranium species. These particular contaminants, while generally present only in particular industries or industrial waste sites, may be effectively treated using the converted resins described herein.

Systems of the present invention may be more or less integrated with other elements, for example, with a resin conditioning loop to initially treat the bed and place it in sulfate form, or to apply suitable flows of stripping, rinsing or other regeneration fluids to the bed to purge the accumulated contaminants (which may then incinerated, treated as liquid waste, or concentrated to a solid for disposal) and to regenerate the bed. Thus, for example, the regeneration and other treatments may be effected on-site, via a carousel or suitable control valve or bed rotation arrangement. In particular applications, a specialized sensor may be added to confirm that the output stream is free of the target contaminant or to control flow rates, bed switch-out or position in a carousel, or other treatment condition accordingly. Moreover, the beds may be sequenced such that a first number of n vessels $V_1 \ldots V_n$ operate to primarily capture the targeted perchlorate or other species (such as a uranium species or pertechnate) up front by this method, while a second number m of vessels $V_{n+1} \ldots V_{n+m}$ operate on the product of the first n vessels. Both sequences may employ a standard monofunctional anion exchange resin, but the two sets are conditioned and/or regenerated separately so the targeted species is efficiently removes into a small waste stream.

In any of these systems, systems of the invention avoid spiking or release of the many lesser-selectivity ions that may be present in the feed, and provide stability and uniformity of the product so that downstream processes intended to meet a specific standard (such as a UPW or boiler water standard), can dependably achieve the target quality.

The invention being thus disclosed and illustrative embodiments described, further variations and modifications within the scope and spirit of the invention will occur to those skilled in the art, and all such variations and modifications are considered to be within the scope invention, as described herein and by the claims appended hereto.

What is claimed is:

1. A process for removing perchlorate from contaminated water, such process comprising the steps of passing the contaminated water through a bed of anion exchange resin in sulfate form to selectively capture perchlorate present in the water periodically regenerating the bed of anion exchange resin by passing regen fluid therethrough whereby contaminant enters the regen fluid and the anion exchange resin is regenerated such that it can again capture perchlorate present in the contaminated water, passing regen fluid containing said contaminant through a sacrificial bed of exchange resin to transfer the contaminant to the sacrificial bed, and disposing of the sacrificial bed.

* * * * *